United States Patent [19]

Prabhu et al.

[11] Patent Number: 4,479,226
[45] Date of Patent: Oct. 23, 1984

[54] FREQUENCY-HOPPED SINGLE SIDEBAND MOBILE RADIO SYSTEM

[75] Inventors: Vasant K. Prabhu, Holmdel; Raymond Steele, Hazlet, both of N.J.

[73] Assignee: AT&T Bell Laboratories, Murray Hill, N.J.

[21] Appl. No.: 363,273

[22] Filed: Mar. 29, 1982

[51] Int. Cl.³ .............................................. H04K 1/00
[52] U.S. Cl. .................................... 375/1; 375/2.2; 375/43; 375/77; 455/27; 455/33; 455/47; 455/56; 455/63; 455/203
[58] Field of Search .................... 375/1, 2.1, 2.2, 43, 375/58, 77; 370/19; 455/26, 27, 33, 38, 50, 53, 54, 56, 47, 63, 65, 109, 202, 203

[56] References Cited

U.S. PATENT DOCUMENTS

| | | | |
|---|---|---|---|
| 4,019,140 | 4/1977 | Swerdlow | 455/63 |
| 4,066,964 | 1/1978 | Costanza et al. | 455/38 |
| 4,176,316 | 11/1979 | De Rosa et al. | 375/2 |
| 4,184,117 | 1/1980 | Lindner | 455/27 |
| 4,193,030 | 3/1980 | Rabow et al. | 375/2 |
| 4,276,652 | 6/1981 | McCalmont et al. | 455/29 |

OTHER PUBLICATIONS

"A Spread Spectrum Technique for High Capacity Mobile Communications"-G. Cooper et al., Conference Record, 27th Annual Conference IEEE Vehicular Technology Group, Mar. 16-18, 1977, pp. 98-103.
"Single Sideband Transmission for Land Mobile Radio"-B. Lusignan, IEEE Spectrum, Jul. 1978, pp. 33-37.
"The Effects of Mobile Radio Channel Bandwidth Reduction on Spectrum Usage"-W. Pannell, Conference Record, 29th Annual Conference IEEE Vehicular Technology Group, Mar. 27-30, 1979, pp. 95-104.
"The Effect of Fading and Shadowing on Channel Reuse in Mobile Radio"-R. French, IEEE Trans. on Vehicular Technology, vol. VT-28, No. 3, Aug. 1979, pp. 171-181.
"Single Sideband Modulation, A Feasible Technique to Gain Transmission Capacity In Terrestrial Radio Relay Links"-W. Oei et al., Int'l. Conf. on Radio Spectrum Conservation Techniques, Jul. 7-9, 1980, pp. 163-167.
"Performance of a Frequency-Hopped Differentially Modulated Spread Spectrum Receiver in a Rayleigh Fading Channel"-R. Nettleton et al., IEEE Trans. on Vehicular Technology, vol. VT-30, No. 1, Feb. 1981, pp. 14-29.

*Primary Examiner*—Marc E. Bookbinder
*Attorney, Agent, or Firm*—Wendy W. Koba; Erwin W. Pfeifle

[57] ABSTRACT

The present invention relates to a frequency-hopped single sideband (SSB) mobile radio system implemented by hopping the carrier frequency of an input signal ($s(t)$) every $\tau$ seconds. The hopping is controlled by a carrier-frequency-hopped sequence ($f_i(t)$) generated by a carrier-frequency-hopping generator (16,24). When employed in a frequency-hopped SSB transmitter (10), the carrier sequence functions to modulate the input signal, "hopping" it to a different carrier frequency every $\tau$ seconds. The carrier-frequency-hopped SSB receiver (20) employs the identical carrier sequence as used by the transmitter to demodulate the transmitted carrier-frequency-hopped SSB signal, thereby recovering the original single sideband signal ($s(t)$). By frequency hopping the carrier signal of an SSB signal, the present invention mitigates the effects of co-channel interference and frequency selective fading inherent in prior art SSB cellular mobile radio systems.

11 Claims, 5 Drawing Figures

FREQUENCY-HOPPED SINGLE SIDEBAND MOBILE RADIO SYSTEM

BACKGROUND OF THE INVENTION

1. Field of the Invention

The present invention relates to a frequency-hopped single sideband mobile radio system, and more particularly, to a frequency-hopped single sideband system for use in a cellular mobile radio environment wherein the single sideband signal changes its spectral location every $\tau$ seconds and the sequence of frequency bands occupied by the single sideband signal is controlled by a suitable scrambling code.

2. Description of the Prior Art

It is well known that in a cellular mobile communication system increasing the density of users can be achieved by employing spread spectrum modulation techniques rather than conventional FM techniques. A spread spectrum communication system derives its name from a coding technique which translates the usual narrowband information spectrum into a wideband (spread) spectrum which resembles that of noise. There are two spread spectrum systems known in the prior art, namely, phase reversal (or higher or pseudo-random phase modulation) and frequency hopping.

One frequency hopping arrangement is disclosed in U.S. Pat. No. 4,276,652 issued to A. M. McCalmont on June 30, 1981, and relates to a signal scrambling system in which the frequency of the information signal band are inverted by heterodyning the information signal with a varying beat frequency. In accordance with the McCalmont arrangement, the beat frequency varies in a sequence of small increments which, in their totality, provide large overall frequency excursions and which, individually, are sufficiently small to avoid the generation of unduly strong spurious signals within the information signal band.

A system employing both the phase reversal and frequency hopping techniques is disclosed in U.S. Pat. No. 4,193,030 issued to G. Rabow et al on Mar. 11, 1980. This system applies the coding techniques of the prior art to select the frequency of transmission in a pseudo-random fashion. However, within each frequency hop interval, the signal is further modulated by selecting its phase as 0 degrees or 180 degrees, also in pseudo-random fashion.

The above-described systems, as well as many other prior art systems, employ frequency modulation (FM) techniques. Although frequency modulation systems are wide-spread and highly successful, the ever-increasing demand for higher system capacity, together with a shortage of available frequencies in the microwave spectrum, has led to a search for a more efficient modulation scheme. This search has concentrated on single sideband modulation (SSB), a well-known technique wherein the speech signal is linearly translated in frequency to a spectral location suitable for radio transmission. Unfortunately, with the use of SSB modulation, co-channel interference becomes extremely disturbing to those using the system. One technique for suppressing co-channel interference in SSB systems is disclosed in U.S. Pat. No. 4,019,140 issued to R. Swerdlow on Apr. 19, 1977. As disclosed, intelligible crosstalk, or co-channel interference, is substantially eliminated by phase-modulating the AM carrier-wave prior to its modulation by the baseband signal. Such a system, however, would require extensive modification and would be able to accommodate only a small number of users if it were to be used in a cellular mobile radio system employing frequency reuse, and would also subject stationary users to disruption in communications due to frequency-selective fade problems.

A problem remaining in the prior art, therefore, is to provide a method for employing single sideband modulation in a cellular mobile radio system which may serve a large number of users without incurring severe co-channel interference, while having the ability to reduce the probability of complete disruption in communications for those mobiles that are either stationary or at low speeds as found in dense traffic conditions in urban areas.

SUMMARY OF THE INVENTION

The problem remaining in the prior art has been solved in accordance with the present invention, which relates to a frequency-hopped single sideband mobile radio system, and more particularly, to a frequency-hopped single sideband system for use in a cellular mobile radio environment wherein the single sideband signal changes its spectral location every $\tau$ seconds and the sequence of frequency bands occupied is controlled by a suitable scrambling code.

It is an aspect of the present invention to provide a means for employing a single sideband transmission scheme in a mobile radio environment which overcomes the crosstalk interference problem inherent in multiple signal single sideband systems. In accordance with the present invention, the crosstalk interference problem is overcome by hopping the carrier frequency of each single sideband signal, changing the interference from the reception of an unwanted speech signal to that of noise with random-like properties, where the reception of the interfering noise is subjectively more acceptable than conversations in the background.

It is another aspect of the present invention to provide improved transmission and reception capabilities of a stationary mobile unit which is situated in an area subjected to a deep communication fade which completely disrupts the communication. Since fading is a frequency dependent condition, the application of frequency-hopping in accordance with the present invention, increases the likelihood of maintaining communication, albeit with some degradation in the recovered speech quality, as the probability of repeatedly hopping into a deep fade condition is small. Frequency hopping ensures that no mobile unit is ever in a permanent deep fade, provided the mobile is not in a completely hostile environment, such as a tunnel, etc.

It is a further aspect of the present invention to provide a single sideband system that offers a degree of communication privacy to the users of the system by controlling the sequence of hopped carrier frequencies by a suitable scrambling code.

Other and further aspects of the present invention will become apparent during the course of the following description, and by reference to the accompanying drawings.

BRIEF DESCRIPTION OF THE DRAWINGS

Referring now to the drawings, where like numerals represent like parts in several views.

DETAILED DESCRIPTION

For the purposes of illustration, the present invention will be discussed from the viewpoint of signal flow from a mobile unit to a base station. It must be appreciated, however, that communication will, in fact, also take place in the opposite direction, that is, with a base station transmitting a signal to a mobile unit, and remain within the scope of the present invention.

Figure 1:
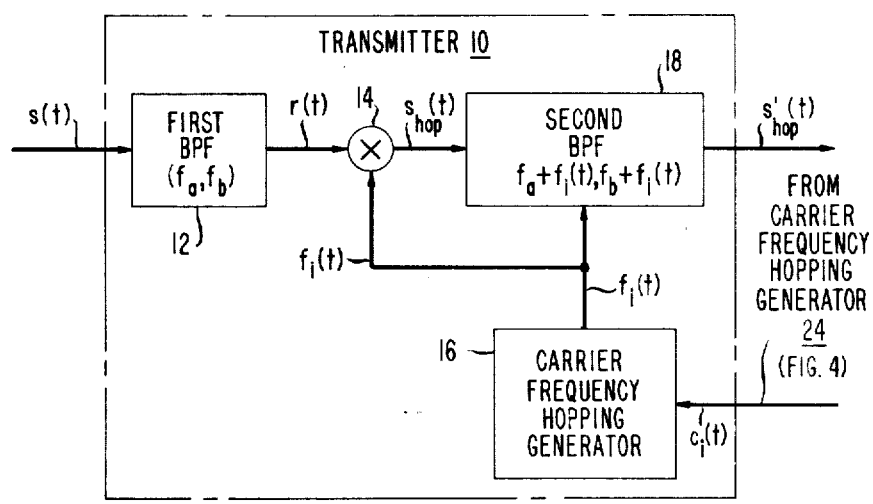
FIG. 1 illustrates an exemplary frequency-hopping single sideband transmitter for inclusion in a mobile unit formed in accordance with the present invention.

A block diagram of an exemplary frequency-hopped single sideband transmitter 10 for use, for example, in a mobile unit of a mobile radio system is illustrated in FIG. 1. In operation, an input signal s(t), for example, a speech signal, enters transmitter 10 and is applied as an input to a first bandpass filter 12. First bandpass filter 12 functions to limit the output signal therefrom to a predetermined frequency range $f_a$ to $f_b$ and produce as an output a filtered speech signal r(t). Assuming r(t) is allowed to reside in a frequency band of $B_c$ Hz, extending from 0 to 4 kHz, for example, the input speech signal may be bandlimited by first bandpass filter 12 to the band $f_a=0.3$ kHz to $f_b=3.3$ kHz, for example, where these values of $f_a$ and $f_b$ are typical for telephony applications.

Figure 2:
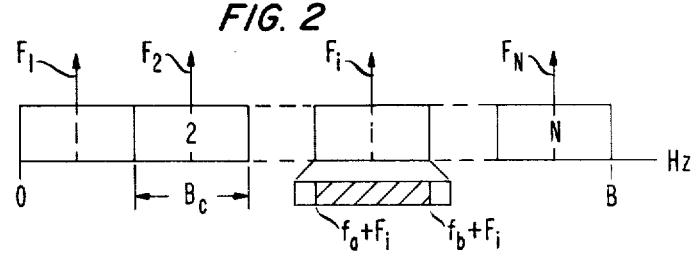
FIG. 2 illustrates an exemplary division of N channels and N carrier hopping frequencies for an allocated bandwidth of B Hz for use in association with the present invention.

In accordance with the present invention, the filtered speech signal r(t) from first bandpass filter 12 is subsequently applied as a first input to a multiplier 14 where a second input to multiplier 14 is a carrier-frequency-hopping sequence $f_i(t)$. Carrier frequency sequence $f_i(t)$ is generated by a carrier-frequency-hopping generator 16 included in transmitter 10. In general, generator 16 is under the control of a carrier-frequency-hopping generator 24 included in a base station 30 (not shown), which sends a command to the mobile including transmitter 10 initializing generator 16 and dictating the carrier-frequency-hopping sequence to be used by the mobile during transmission. Pseudo-random generator arrangements are well-known in the art, and any one may be employed to produce a pseudo-random sequence of carrier frequencies that contain the set of carrier frequencies $\{F_1, F_2, \ldots, F_N\}$. These pseudo-random sequences of carrier frequencies are utilized to hop the input signal s(t) around its allotted frequency band. For example, if the total bandwidth allotted to a cell in a system formed in accordance with the present invention is B Hz, and an exemplary filtered speech signal r(t) having a bandwidth of $f_b$-$f_a$ is located within the bandwidth of $B_c$ Hz, the total bandwidth B could be divided into N channels, where $N=B/B_c$. In accordance with the present invention, therefore, generator 16 functions to produce a pseudo-random sequence of N distinct carrier frequencies $\{F_1, F_2, \ldots, F_N\}$, where an exemplary carrier frequency $F_i$ is the carrier frequency that positions an SSB signal into the $i^{th}$ spectral channel in the bandwidth B. An illustration of the relationship of B, $B_c$, N and the set of carrier frequencies $\{F_1, F_2, \ldots, F_N\}$ is shown in FIG. 2. FIG. 2 also includes a detailed illustration of the spectral location of an SSB signal for $\tau$ seconds when the carrier-frequency-hopped sequence has a value of $F_i$.

In operation of the present invention, generator 16 produces one carrier frequency every $\tau$ seconds, where one exemplary sequence may be $f_i(t)=\{F_2, F_4, F_6, F_1, F_n, \ldots\}$. Therefore, the output of multiplier 14 will be a double sideband, suppressed carrier signal $s_{hop}(t)$, whose spectral location is altered every $\tau$ seconds in accordance with the carrier frequency sequence $f_i(t)$.

Prior to transmission, the output signal $s_{hop}(t)$ from multiplier 14, is applied as an input to a second bandpass filter 18, as shown in FIG. 1. Second bandpass filter 18 comprises the same bandwidth as first bandpass filter 12, that is, from $f_a$ to $f_b$, but where the passband frequencies are moved to occupy the frequency region $f_i+f_a$ to $f_i+f_b$. Second bandpass filter 18 functions to filter out one sideband of double sideband output signal $s_{hop}(t)$, for example, the lower sideband, to produce as an output of transmitter 10 a carrier-frequency-hopped single sideband signal $s'_{hop}(t)$. Accordingly, in order to allow the frequency band of second bandpass filter 18 to track the movement of the single sideband signal, the output of carrier-frequency-hopping generator 16 is also applied as an input to second bandpass filter 18. An exemplary arrangement of a bandpass filter capable of performing the tracking function of second bandpass filter 18 is disclosed in U.S. Pat. No. 4,232,269 issued to G. Willoner on Nov. 4, 1980, which teaches the formation of a digitally programmable active RC bandpass filter with constant absolute bandwidth.

Figure 3:
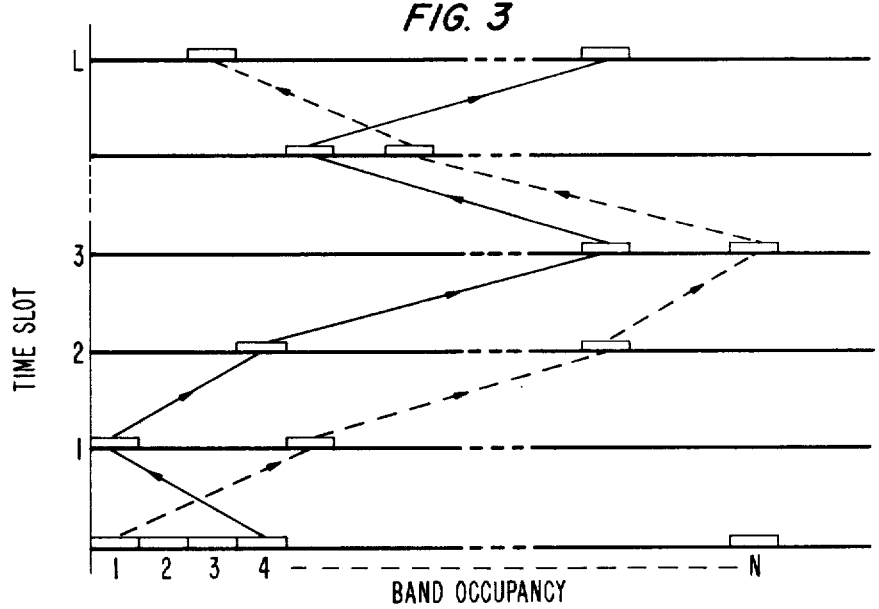
FIG. 3 illustrates the movement of the spectral locations of two arbitrary carrier frequency-hopped SSB signals for successive values of $\tau$, emenating from an exemplary transmitter formed in accordance with the present invention.

In a mobile radio system, a given transmitter 10 may be in such a location that the signal it desires to transmit will be subject to a deep fade condition, that is, where the specific RF bandwidth is subject to severe attenuation. This problem is avoided in the present invention by controlling the output of generator 16 in a manner whereby successive carrier-frequency-hopping output signals are in non-contiguous channels, i.e., more than one channel separates a successive carrier frequency and in general, the frequency hopping distance will encompass many channels, and ideally exceed the coherence bandwidth, as defined in "Microwave Mobile Communications", W. C. Jakes, ed. Wiley, 1974. An illustration of two exemplary output signals from multiplier 14 is illustrated in FIG. 3, where as shown for successive time slots 1, 2, . . . ,L, each signal hops a distance greater than one channel.

Figure 4:
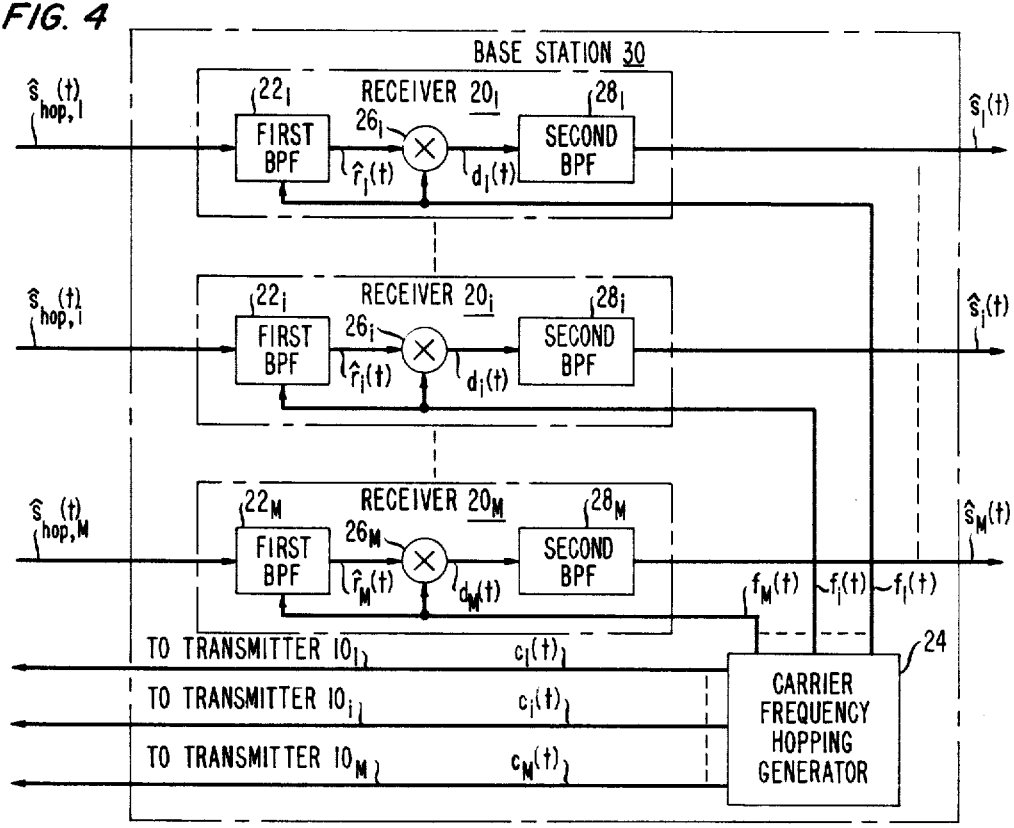
FIG. 4 illustrates an exemplary base station capable of receiving and demodulating a plurality of M carrier-frequency-hopped single sideband signals in accordance with the present invention.

In the application of the present invention in a cellular mobile radio system, there will be a plurality of M (generally not greater than N) mobile units in communication with a single base station 30 in a particular cell, where an exemplary base station 30 is illustrated in FIG. 4. Each mobile in a particular cell comprises a separate one of a plurality of M transmitters $10_1$-$10_M$, where each transmitter functions as described hereinabove in association with transmitter 10 of FIG. 1. In accordance with the present invention, each mobile unit $10_1$-$10_M$ communicates with cell base station 30 via a distinctly different carrier frequency sequence $f_1(t)$-$f_M(t)$, respectively. To ensure that each sequence is, in fact, unique, the plurality of M carrier-frequency-hopped sequences $f_1(t)$ through $f_M(t)$ are determined by a single synchronized carrier-frequency-hopped generator 24 located at base station 30, as shown in FIG. 4.

Carrier-frequency-hopping generator 24, as mentioned hereinbefore in relation to transmitter 10 of FIG. 1, broadcasts a plurality of assignment codes $c_1(t)-c_M(t)$, such that transmitters $10_1-10_M$ utilize the identical carrier-frequency-hopped sequences as receivers $20_1-20_M$, respectively. That is, assignment code $c_i(t)$ related to carrier-frequency-hopped sequence $f_i(t)$ is broadcast to transmitter $10_j$ when receiver $20_j$ is also assigned carrier-frequency-hopped sequence $f_i(t)$.

For an exemplary mobile comprising transmitter $10_i$, therefore, received assignment code $c_i(t)$ may be thought of as an address which is related to carrier-frequency-hopped sequence $f_i(t)$. Therefore, generator 16 produces as an output sequence $f_i(t)$, which as described hereinabove, is applied as an input to both multiplier $14_i$, and second bandpass filter $18_i$, and functions as described hereinabove in association with transmitter 10 of FIG. 1.

Each of the separate carrier-frequency-hopped sequences $f_1(t)$ through $f_M(t)$ is also utilized by base station 30 to correctly demodulate the plurality of M carrier-frequency-hopped signals $\hat{s}_{hop,1}(t)-\hat{s}_{hop,M}(t)$ which it receives from mobile units comprising transmitters $10_1-10_M$, respectively. As shown in FIG. 4, each of the separate carrier-frequency-hopped sequences $f_1(t)-f_M(t)$ is applied as an input to a separate one of a plurality of receivers $20_1-20_M$ included in base station 30, where receivers $20_1$, $20_i$, and $20_M$ are illustrated in detail.

In operation, receiver $20_i$ functions to demodulate the received carrier-frequency-hopped signal $\hat{s}_{hop,i}(t)$. Since the signal produced by transmitter $10_i$ travels through the communication medium before being received by receiver $20_i$, some signal degradation will occur, and, therefore, the signal received by receiver $20_i$, $\hat{s}_{hop,i}(t)$, is an approximation of the transmitted signal $s_{hop,i}(t)$. Upon reception, received carrier-frequency-hopped SSB signal $\hat{s}_{hop,i}(t)$ is applied as an input to a first bandpass filter $22_i$, where first bandpass filter $22_i$ like second bandpass filter $18_i$ of transmitter $10_i$, is capable of passing only the portion of the received signal in the frequency band $f_a+f_i(t)$ to $f_b+f_i(t)$ where $f_a$, $f_b$, and $f_i(t)$ are the frequencies described hereinabove in association with transmitter 10 of FIG. 1. In order for the sequence of frequencies $f_i(t)$ used by first bandpass filter $22_i$ to correctly filter the received signal, carrier-frequency-hopped generator 24 included in base station 30 must operate in synchronization with transmitter $10_i$, producing the same carrier frequency in every $\tau$ seconds as employed by transmitter $10_i$. One exemplary synchronization method is disclosed in U.S. Pat. No. 3,641,433 issued to R. Mifflin et al on Feb. 8, 1972, which describes a transmitted reference synchronization system.

Therefore, assuming that carrier-frequency-hopping generator 24 does, in fact, apply the same set of frequencies in synchronization with transmitter $10_i$, the output of first bandpass filter $22_i$ will be a received filter carrier-frequency-hopped SSB signal $\hat{r}_i(t)$. SSB signal $\hat{r}_i(t)$ is subsequently applied as a first input to a multiplier $26_i$, where the second input to multiplier $26_i$ is the carrier-frequency-hopped sequence $f_i(t)$ produced by carrier-frequency-hopping generator 24. Multiplier $26_i$ together with a second bandpass filter $28_i$ whoe frequency passband is $f_b-f_c$ Hz, functions to demodulate the carrier-frequency-hopped SSB signal $r_i(t)$. Since the sequence of carrier frequencies used by transmitter $10_i$ enable the baseband voice signal $s_i(t)$ to be SSB modulated and frequency hopped, and they are identical to those used by receiver $20_i$ in the demodulation process, the output signal $\hat{s}_i(t)$ of second bandpass filter $28_i$ is the recovered speech signal corresponding to the original signals $\hat{s}_i(t)$. As mentioned hereinabove, the correspondence between $\hat{s}_i(t)$ and $\hat{s}_i(t)$ is limited by transmission channel and circuit imperfections.

Since each separate receiver $20_1-20_M$ functions as described hereinabove in association with receiver $20_i$, base station 30 is capable of producing M separate output signals $\hat{s}_1(t)-\hat{s}_M(t)$ which correspond to the M separate input signals $s_1(t)-s_M(t)$ modulated and transmitted by transmitters $10_1-10_M$, respectively.

Figure 5:
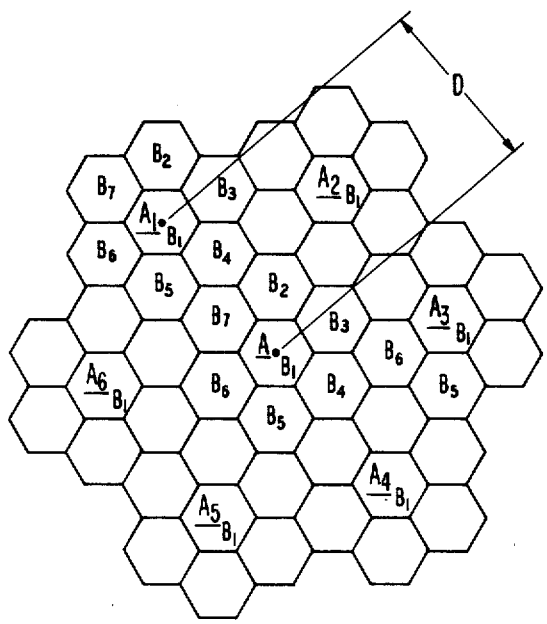
FIG. 5 illustrates an exemplary hexagonal cellular configuration of a mobile radio system capable of employing the present invention.

A simple diagram of a cellular mobile radio system comprising hexagonal cells is illustrated in FIG. 5, where it is to be understood that the hexagonal cellular configuration is exemplary and for illustrative purposes only, since in the practice with the present invention, the individual cells may comprise any configuration known in the art. Assuming that the total available system bandwidth is equal to $B_T$, it is common practice in a hexagon cellular system to partition the bandwidth $B_T$ into equal segments, assigning a different segment to each cell of a set of contiguous cells, where in FIG. 5 a cluster of seven such cells, each allocated separate bandwidths, $B_1-B_7$, is shown. If, in the example shown in FIG. 5, more than seven cells of a predetermined size are required to accommodate the user area demand, some frequency bands must be reused. The arrangement illustrated in FIG. 5 reuses all seven frequency bands and attempts to keep the distance between cells using the same frequency band large in order to restrict mutual interference. For example, the cells using frequency band $B_1$ are spaced a distance D apart, where this distance is measured from the respective centers of the cells, as shown in FIG. 5.

A mobile unit traveling in a central cell, denoted A, using frequency band $B_1$ will receive co-channel interference from each of the outlying cells also using frequency band $B_1$. In studying co-channel interference, the six closest co-channel cells, labeled $A_1-A_6$, cause the dominant co-channel interference. If carrier-frequency-hopping is not used, the mobile in cell A will receive interference in the form of intelligible crosstalk from cells $A_1-A_6$. However, when carrier-frequency-hopping is employed in accordance with the present invention, each cell in the set of cells $A_1-A_6$ will perform carrier-frequency-hopping with different and distinct sets of carrier frequency sequences. Thus, the mobile in cell A, upon receiving separate interfering signals from cells $A_1-A_6$, will demodulate these signals with the unique carrier frequency sequence belonging to cell A. Consequently, the mobile in cell A will recover the desired signal, and the interfering signals will be demodulated as incoherent signals. Thus, because the carrier frequency sequence unique to the mobile in cell A is incorrect to demodulate the signals from cells $A_1-A_6$, all of the demodulated interference signals, when added together will become more noise-like and in the case of speech transmission, perceptually more acceptable than a single coherent interfering speech signal.

As the mobile in cell A leaves this cell and enters one of the adjacent cells, for example, a cell which employs frequency band $B_3$, the mobile ceases to communicate via the base station in cell A and begins to communicate via the base station in its new cell. The mobile may or may not maintain the same carrier frequency sequence—either alternative is possible in accordance with the present invention. That is, in a set of seven contiguous cells employing different frequency bands, the mobile may retain the same carrier frequency sequence and merely change the spectral location that the sequence is used in as the mobile travels from cell to cell. Alternatively, each base station may transmit a different carrier frequency sequence assignment code to the mobile as it enters its cell. In either case, information must be "handed-off" between the base stations in cell A and the new cell the mobile enters. There exist many methods of completing this handing off which are well known in the art, where one such arrangement is disclosed in U.S. Pat. No. 3,714,574 issued to T. Baba et al on Jan. 30, 1973 which relates to a mobile communicating system.

Although frequency hopping does not alter the signal-to-noise ratio of SSB systems, computed using long-term averaging, it does have important perceptual advantages. For example, consider a stationary mobile, e.g., parked or in congested traffic, operating in a SSB system that does not employ frequency hopping. Suppose the mobile is subjected to a deep fade that results in a complete disruption of communication. Since such a fade is frequency dependent, if frequency hopping is applied in such a situation, the probability that communication will be restored increases, since the probability of repeatedly hopping into a deep fade condition is small. Of course, if the mobile was not in a deep fade but receiving excellent communications, the effect of frequency hopping would degrade the recovered speech although the degradation would be minimal. What frequency hopping ensures, therefore, is that no mobile will ever be in a permanent deep fade. Further, in cellular mobile radio systems employing frequency reuse, co-channel interference exists in the form of cross-talk among the mobiles in all of the cells using the same segment of the frequency band. By applying frequency hopping, in accordance with the present invention, the co-channel interference is changed from cross-talk to random-like noise, as each mobile demodulates using its unique frequency hopping sequence. Additionally, as each signal broadcast by a mobile transmitter is "hopped" around the N channels at a rate of one hop every $\tau$ seconds, only the intended receiver knows the hopping sequence, or code, employed and is able to demodulate correctly the transmitted signal. Therefore, a single sideband transmission system formed in accordance with the present invention will deter eavesdropping, providing a measure of security over the communication path. Lastly, as all such transmission systems are in general subjected to fading, well known methods, such as the inclusion of pilot tones can, in general, be added to this transmitted carrier-frequency-hopped SSB signal $s_{hop}(t)$ as it is employed in accordance with the present invention.

What is claimed is:

1. In a system for communicating a message signal (s(t))
    a transmitter (10) responsive to said message signal for producing as an output a carrier-frequency-hopped single sideband signal ($s'_{hop}(t)$), wherein said transmitter comprises
    carrier-frequency-hopping generating means (16) for generating as an output a unique sequence of separate carrier frequencies ($f_i(t)$) from a plurality of N possible carrier frequencies ($F_1, F_2, \ldots, F_N$);
    multiplying means (12, 14, 18) responsive to both said message signal and said unique sequence of carrier frequencies for multiplying said message signal with said unique sequence of carrier frequencies and producing as an output of said transmitter the carrier-frequency-hopped single sideband signal; and
    a receiver (20) responsive to said carrier-frequency-hopped single sideband signal produced by said transmitter and receiving therefrom said message signal, wherein said receiver comprises
    carrier-frequency-hopping generating means (24) for generating as an output said unique sequence of separate carrier frequencies generated by said transmitter carrier-frequency-hopping generating means, said receiver carrier-frequency-hopping generating means also capable of producing as an output an assignment code (c(t)) associated with said unique sequence of carrier frequencies wherein said transmitter carrier-frequency-hopping generating means is responsive to said assignment code generated by said receiver carrier-frequency-hopping generating means for producing as an output said unique sequence of carrier frequencies related thereto; and
    demodulating means (22, 26, 28) responsive to both the received carrier-frequency-hopped single sideband signal ($\hat{s}'_{hop}(t)$) and said unique sequence of separate carrier frequencies for demodulating said received carrier-frequency-hopped single sideband signal in accordance with said unique sequence of separate carrier frequencies and producing as an output of said receiver the message signal applied as an input of said transmitter.

2. A communication system formed in accordance with claim 1 wherein
    the message signal (s(t)) is multiplied with a sequence of pseudo-random carrier frequencies such that said message signal can only be recovered by a receiver that has knowledge of said sequence of pseudo-random carrier frequencies.

3. A communication system formed in accordance with claim 1 wherein
    the multiplying means comprises
    a first bandpass filter (12) responsive to the message signal for producing as an output a filtered message signal (r(t)) equal to the portion of said message signal appearing in a predetermined frequency range ($f_a$–$f_b$);
    a multiplier (14) responsive to both said filtered message signal and the unique sequence of separate carrier frequencies for producing as an output a carrier-frequency-hopped message signal ($s_{hop}(t)$) equal to the multiplicative product thereof; and
    a second bandpass filter (18) responsive to both said carrier-frequency-hopped message signal and said unique sequence of separate carrier frequencies for removing unwanted components from said carrier-frequency-hopped message signal and producing as an output of said transmitter the carrier-frequency-hopped single sideband signal ($s'_{hop}(t)$); and
    the demodulating means comprises
    a first bandpass filter (22) responsive to both the received carrier-frequency-hopped single sideband signal and the unique sequence of carrier frequencies for producing as an output a filtered carrier-frequency-hopped single sideband signal (f(t));
    a multiplier (26) responsive to both said filtered carrier-frequency-hopped single sideband signal and said unique sequence of carrier frequencies for producing as an output a multiplicative product thereof (d(t)); and a second bandpass filter (28) responsive to said multiplicative product signal for removing unwanted components therefrom and producing as an output of said receiver the message signal applied as an input to said transmitter.

4. A transmitter (10) for communicating a message signal (s(t)) wherein said transmitter is responsive to said message signal for producing as an output a carrier-frequency-hopped single sideband signal s'$_{hop}$(t)), wherein said transmitter comprises carrier-frequency-hopping generating means (16) for generating as an output a unique sequence of separate carrier frequencies (f$_i$(t)) from a plurality of N possible carrier frequencies; and multiplying means (12, 14, 18) responsive to both said message signal and said unique sequence of separate carrier frequencies for multiplying said message signal with said unique sequence of carrier frequencies and producing as an output of said transmitter the carrier-frequency-hopped single sideband signal, where the multiplying means comprises a first bandpass filter (12) responsive to the message signal for producing as an output a filtered message signal r(t) equal to the portion of said message signal appearing in a predetermined frequency range (f$_a$–f$_b$);

a multiplier (14) responsive to both said filtered message signal and the unique sequence of separate carrier frequencies for producing as an output a carrier-frequency-hopped message signal (S$_{hop}$(t)) equal to the multiplicative produce thereof; and a second bandpass filter (18) responsive to both said carrier-frequency-hopped message signal and said unique sequence of separate carrier frequencies for removing unwanted components from said carrier-frequency-hopped message signal and producing as an output of said transmitter the carrier-frequency-hopped single sideband signal (s'$_{hop}$(t)).

5. A receiver (20) capable of receiving and demodulating a carrier-frequency-hopped single sideband signal (ŝ'$_{hop}$(t)) and recovering therefrom a message signal (ŝ(t)) wherein the receiver comprises carrier-frequency-hopping generating means (24) for generating as an output a unique sequence of separate carrier frequencies relates to the received carrier-frequency-hopped single sideband signal; and demodulating means (22, 26, 28) responsive to both said received carrier-frequency-hopped single sideband signal and said unique sequence of separate carrier frequencies for demodulating said received carrier-frequency-hopped single sideband signal in accordance with said unique sequence of separate carrier frequencies and producing as an output of said receiver the message signal related thereto, wherein the demodulating means comprises a first bandpass filter (22) responsive to both the received carrier-frequency-hopped single sideband signal and the unique sequence of carrier frequencies for producing as an output a filtered carrier-frequency-hopped single sideband signal (r(t));

a multiplier (26) responsive to both said filtered carrier-frequency-hopped single sideband signal and said unique sequence of carrier frequencies for producing as an output a multiplicative product thereof (d(t)); and a second bandpass filter (28) responsive to said multiplicative product signal for removing unwanted components therefrom and producing as an output of said receiver the message signal related thereto.

6. A communication system employing single sideband modulation, comprising a plurality of M mobile units, each mobile unit capable of accepting a separate message signal (s$_1$(t)–s$_m$(t)), multiplying means in each mobile unit for multiplying a separate message signal by a separate one of a plurality of M distinct carrier-frequency-hopping sequences (f$_1$(t)–f$_m$(t)) to produce as an output a separate one of a plurality of M unique carrier-frequency-hopped single sideband signals (s'$_{hop,1}$(t)–s'$_{hop,M}$(t)); and a base station responsive to and capable of demodulating said plurality of M unique carrier-frequency-hopped single sideband signals and recovering therefrom a plurality of M separate message signals (ŝ$_1$(t)–ŝ$_m$(t)).

7. A communication system in accordance with claim 6 wherein each mobile unit of the plurality of M mobile units comprises a carrier-frequency-hopping generator means (16) for generating a unique carrier-frequency-hopped sequence; and the base station comprises a carrier-frequency-hopping generating means (24) for generating both the plurality of M distinct carrier-frequency-hopping sequences employed by said plurality of M mobile units and a plurality of M assignment codes (c$_1$(t)–C$_M$(t)), where each assignment code is associated with a separate one of said plurality of M distinct carrier-frequency-hopping sequences, said base station capable of transmitting each assignment code of said plurality of M assignment codes to a separate one of said plurality of M carrier-frequency-hopping generating means of said M mobile units for assigning the unique carrier-frequency-hopping sequence thereto.

8. A communication system in accordance with claim 7 wherein the base station carrier-frequency-hopping generating means is capable of generating the plurality of M distinct carrier-frequency-hopping sequences such that at any instant of time each mobile unit in communication therewith is employing a different carrier frequency.

9. A communication system in accordance with claim 7 wherein the base station carrier-frequency-hopping generating means is capable of generating M distinct carrier-frequency-hopping sequences wherein for any carrier-frequency-hopping sequence two consecutive carrier frequencies in said carrier-frequency-hopping sequence are separated in frequency by a predetermined amount to reduce the probability of fading in both carrier frequencies.

10. A communication system employing single sideband modulation, comprising a plurality of mobile units, each mobile unit capable of accepting a separate message signal, multiplying means in each mobile unit for multiplying separate message signal by a separate one of a plurality of distinct carrier-frequency-hopping sequences and said plurality of mobile units is capable of producing as an output a plurality of unique carrier-frequency-hopped single sideband signals; and a plurality of base stations, each base station encompassing a distinct geographic area and contiguous base stations alloted a separate portion ($B_1$–$B_7$) of a predetermined total frequency band wherein each base station comprises a carrier-frequency-hopping generating means for generating a plurality of distinct carrier-hopping frequencies such that each carrier element of each sequence of said plurality of distinct sequences resides in said alloted portion of said total frequency band such that each base station is capable of communicating with any mobile units located in its associated geographic area.

11. A communication system in accordance with claim 10 wherein a set of base stations ($A_1$–$A_6$) alloted the identical portion ($B_j$) of the predetermined total frequency band are located a predetermined distance (D) apart, each base station in said set of base stations generates a unique plurality of carrier-frequency-hopped sequences such that interference between the separate pluralities of carrier-frequency-hopped sequences produced by said set of base stations is in the form of a pseudo-random signal.

* * * * *

UNITED STATES PATENT AND TRADEMARK OFFICE
CERTIFICATE OF CORRECTION

PATENT NO. : 4,479,226
DATED : October 23, 1984
INVENTOR(S) : Vasant K. Prabhu and Raymond Steele It is certified that error appears in the above-identified patent and that said Letters Patent is hereby corrected as shown below:

Column 2, line 38, "able than" should read --able than attempting to hold a conversation while hearing other--.
Column 5, line 64, "whoe" should read --whose--.
Column 9, line 65, "(r(t));" should read --($\hat{r}(t)$);--.

Signed and Sealed this

Twenty-fifth Day of June 1985

[SEAL]

Attest:

DONALD J. QUIGG

Attesting Officer     Acting Commissioner of Patents and Trademarks